(12) United States Patent
Rowe et al.

(10) Patent No.: US 7,347,761 B2
(45) Date of Patent: Mar. 25, 2008

(54) MOTORIZED AMUSEMENT DEVICE

(75) Inventors: Rick Rowe, Las Vegas, NV (US); John Rowe, Tucson, AZ (US)

(73) Assignee: Think Tek, Inc., Las Vegas, NV (US)

( * ) Notice: Subject to any disclaimer, the term of this patent is extended or adjusted under 35 U.S.C. 154(b) by 225 days.

(21) Appl. No.: 11/120,362

(22) Filed: May 2, 2005

(65) Prior Publication Data
US 2006/0154558 A1 Jul. 13, 2006

Related U.S. Application Data

(63) Continuation-in-part of application No. 11/032,722, filed on Jan. 10, 2005, now abandoned.

(51) Int. Cl.
*A63H 17/00* (2006.01)
(52) U.S. Cl. ............... 446/279; 446/280; 446/292; 446/465
(58) Field of Classification Search ............... 446/175, 446/270–280, 288–292, 441–449, 454–450, 446/460
See application file for complete search history.

(56) References Cited
U.S. PATENT DOCUMENTS

| | | | | |
|---|---|---|---|---|
| 3,303,821 A | | 2/1967 | Harris | |
| 3,797,404 A | * | 3/1974 | Barlow et al. | 104/304 |
| 4,391,224 A | | 7/1983 | Adler | |
| 4,662,856 A | * | 5/1987 | Getgey et al. | 446/280 |
| 5,524,326 A | | 6/1996 | Markowitz | |
| 5,765,508 A | | 6/1998 | Markowitz | |
| 6,171,172 B1 | * | 1/2001 | Foster et al. | 446/441 |
| 6,758,719 B1 | * | 7/2004 | Nava | 446/466 |
| 6,780,077 B2 | * | 8/2004 | Baumgartner et al. | 446/175 |
| 2003/0148703 A1 | * | 8/2003 | Scott et al. | 446/456 |

FOREIGN PATENT DOCUMENTS

GB 2119267 11/1983

* cited by examiner

*Primary Examiner*—Nini F. Legesse
(74) *Attorney, Agent, or Firm*—Weide & Miller, Ltd.

(57) ABSTRACT

A toy is comprised of a propulsion system, such as a frame rollably supported by one or more driven wheels. The toy may be configured generically to include one or more platforms and a mounting bracket for connecting or supporting a variety of elements for transport and the remote control is used to control the toy, such as to cause the toy to move forward, in reverse, to stop, and to turn. In one embodiment the toy is utilized to entertain a pet, the toy having an animal likeness connected thereto. The animal likeness maybe animated and controlled remotely as well. The animal likeness is enticing to a pet in engaging in hunting and tracking of the toy.

9 Claims, 4 Drawing Sheets

MOTORIZED AMUSEMENT DEVICE

RELATED APPLICATION DATA

This application is a continuation-in-part of U.S. application Ser. No. 11/032,722, filed Jan. 10, 2005 now abandoned.

FIELD OF THE INVENTION

The present invention relates to entertainment or amusement devices, and particularly to a motorized pet toy.

BACKGROUND OF THE INVENTION

A variety of toys have been created for amusing and entertaining pets. For example, these toys include rubber bones for chewing, ropes for tugging and toys employing squeakers.

Pets, especially including dogs and cats, find great amusement in chasing things. For example, dogs like to chase and retrieve sticks and balls which their master may throw. Cats like to chase yarn and small toys which one drags along the floor.

These toys, however, do not provide a great challenge to the pet and the owner often finds playing with their pet with these toys very tiring. For example, while a dog may seemingly endlessly chase a ball, the owner may quickly tire of throwing the ball and then attempting to retrieve it from the dog. Likewise, one quickly grows tired of dragging string about the floor to entertain a cat.

Generally, the pet's play activities are associated with their instinctive hunting skills. Thus, a dog enjoys chasing a ball as part of the dog's instinct to chase and kill or retrieve prey. Likewise, a cat's chasing of a string or small toy is a product of its hunting instinct. Thus, the more the amusement activity simulates the actual instinctive act, the more fun it is for the pet. Thus, some toys have been created which have the appearance of a mouse, bird or the like.

A pet amusement or entertainment device which is fun for the pet and the owner is desired.

SUMMARY OF THE INVENTION

The invention is an entertainment device. In one embodiment, the device is a self-propelled, remotely controllable toy. The toy preferably includes a frame which is rollably supported for movement over a variety of surfaces. Means, such as one or motors, are configured to propel the toy.

In one embodiment, the toy includes one or more support/connection platforms. The platforms define points of mounting for various items. In a preferred embodiment, the device includes an adjustable bracket configured to be connected to the platforms, the bracket providing a means for connecting a variety of different sized and shaped items or members to the toy.

In one embodiment, the platforms are generally planar and define a number of apertures for accepting fasteners. In one embodiment, the bracket is "H" shaped, having a pair of spaced legs connected by a pair of arms. The length of the legs and arms may be adjusted, thus allowing the length and width of the bracket to be adjusted to accommodate different sized elements. The bracket is configured to span the spaced platforms and connect one or more elements thereto.

In one embodiment, the toy may be used to transport various items. Items may be connected to the toy using the bracket, such as by mounted items to the bracket utilizing hook and loop fastening material. In other embodiments, the bracket may support a plate, container or the like for transporting various items.

The toy may be configured for a variety of purposes, such as for a utilitarian purpose of transporting items from one place to another, or for amusement purposes. For example, the toy may serve as an entertainment device for a child. The toy may be fitted with a stuffed animal, such as a dinosaur, or other items, and then moved about, to the amusement of a child.

In one embodiment, the toy has particular applicability to use as a pet entertainment device or toy. In one configuration, an animal likeness is connected to the bracket and the toy may be moved to entertain a pet in a game of "chase."

In another embodiment, the toy may be specifically configured as a pet entertainment device rather than being generically configured as an entertainment/transport toy. In one embodiment, an animal likeness may be directly connected to the frame of the toy. The likeness may include an electronic connection to the toy to permit user control over animated features of the toy.

Further objects, features, and advantages of the present invention over the prior art will become apparent from the detailed description of the drawings which follows, when considered with the attached figures.

DETAILED DESCRIPTION OF THE INVENTION

The invention is a motorized entertainment device, the device having particular applicability as a pet amusement or entertainment device. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

In general, the entertainment device of the invention comprises a self-propelled, remotely controllable device configured to transport or support one or more elements. In one embodiment, the entertainment device carries or is configured to have the appearance of an animal or other creature and has particular use as a pet entertainment device or toy.

Figure 1:
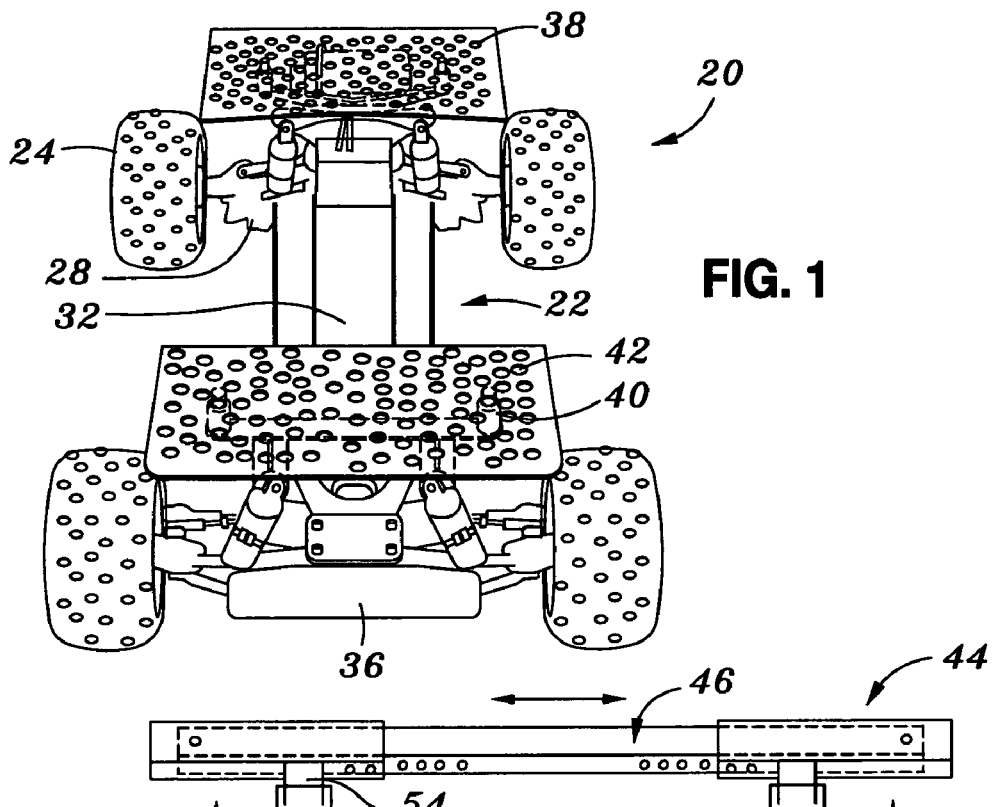
FIG. 1 illustrates one embodiment of a motorized entertainment device in accordance with the invention.

FIG. 1 illustrates an entertainment device 20 in accordance with an embodiment of the invention. The device 20 includes a frame 22 which supports various components. In a preferred embodiment, the device 20 is rollably supported. As illustrated, a plurality of wheels 24 are mounted to the frame 22 for rotation with respect to the frame. In a preferred embodiment, the device 20 has four wheels 24 generally arranged in automobile format, with two front wheels and two rear wheels, with two wheels located at each side of the frame 22.

Preferably, the device 20 is self-propelled or locomotive. Thus, in one embodiment, the device 20 includes means for driving one or more of the wheels. In one embodiment, the device 20 includes one or more motors 28 which are configured to drive one or more of the wheels 24 for propelling the device. In a preferred embodiment, the one or more motors are electrically powered. The one or more motors 28 may be configured to drive the device 20 to stop and start the motion of the device 20, and permit motion in forward and reverse directions.

An electrical source is configured to power the motor(s) in such a configuration. In one embodiment, the electrical source comprises one or more batteries 32, whereby the power source for the motor(s) is portable and may travel with the device 20. In one embodiment, the battery or batteries 32 may be disconnected from the frame 22. The battery or batteries 32 may be of various types, including rechargeable.

In one embodiment, the one or motors are remotely controllable. The device 20 preferably includes one or more receivers (not shown). The at least one receiver is configured to receive signals from a remote control (not shown). Preferably, the receiver is configured to provide an output in response to a signal received from the remote control. In one embodiment, the output is provided to a main controller which utilizes the signals to provide discrete outputs to the various components of the device 20, such as the motors, for controlling them.

One or more solenoids 36 or other means may be provided for moving one or more of the wheels 24, such as for steering and directing the toy as it moves. The controller may be configured to output a signal to the one or more solenoids 36 for such a purpose.

In a preferred embodiment of the invention, the motorized entertainment device 20 includes at least one universal mounting platform 38. As illustrated, the device 20 includes two such platforms 38. In one embodiment, each platform 38 is generally planar, having a top surface, an opposing bottom surface, and a peripheral edge. As illustrated, the platforms 38 are somewhat rectangular in shape, though they may have a variety of shapes.

In the embodiment illustrated, a frame mount 40 extends upwardly from the frame or associated elements at the front and rear of the device 20, between front and rear pairs of the wheels 24. Each platform 38 is connected to one of those mounts 40. Preferably, at least the top surface of each platform 38 is positioned above the wheels 24, so that items supported by the platform do not contact the wheels during operation of the device.

In a preferred embodiment, each platform 38 has a plurality of apertures 42 therethrough. In one embodiment, each frame mount 40 includes a pair of upwardly extending pins which engage mating apertures 42 in the associated platform 38. The platforms 38 could have other types of mounting points, such as hooks, threaded passages or the like.

The platform(s) 38 of the motorized entertainment device 20 are configured to support a variety of elements. This allows, as described in more detail below, the device 20 to be used to transport items and/or allows items to be connected to the device 20 for use in entertaining a pet or for other purposes.

As illustrated, the platform(s) 38 define an elevated support for one or more elements to be connected to the device 20. In the preferred embodiment, the platforms 38 are set above the wheels 24, and yet define discrete mounting points for other elements.

Figure 2:
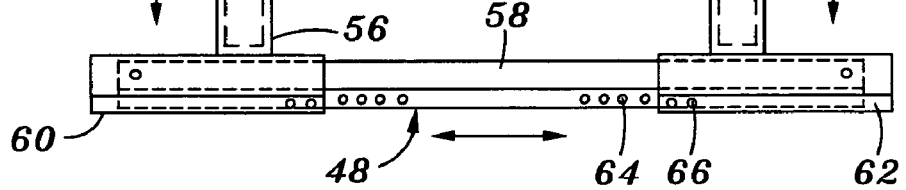
FIG. 2 illustrates a platform mount for use with the motorized entertainment device illustrated in FIG. 1.

In one embodiment, items or elements may be directly connected to the entertainment device 20 by connecting them to the platforms 38. In another embodiment, items or elements are connected to the device 20 via a platform mount. FIG. 2 illustrates one embodiment of such a platform mount comprising an adjustable bracket 44.

Figure 3:
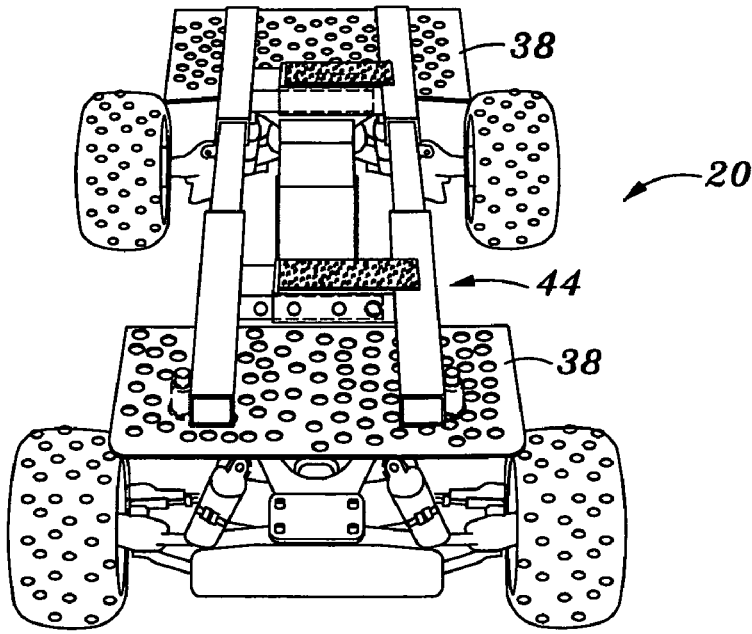
FIG. 3 illustrates the motorized entertainment device of FIG. 1 with the platform mount illustrated in FIG. 2 connected thereto.

As best illustrated in FIG. 3, the bracket 44 is adjustable for use in connecting items or elements of a variety of sizes to the device 20. Referring to FIG. 2, in one embodiment, the bracket 44 is generally "H" shaped, having a first leg 46 and a second leg 48. The legs 46,48 are spaced by a pair of arms 50,52. As illustrated, the legs 46,48 are spaced from one another and extend generally parallel to one another. The arms 50,52 are also spaced from one another and extend generally parallel to one another, but extend generally perpendicular to the legs 46,48.

Preferably, the length and width of the bracket 44 may be selectively changed in order to support different sized items. In one embodiment, each arm 50,52 comprises an inner member 54 and an outer member 56. The outer member 56 is preferably tubular and sized to accept the inner member 54. In one embodiment, the inner and outer members 54,56 may be square in cross-sectional shape in order to prevent relative rotation, but in other embodiment the members might have other cross-sectional shapes.

In one embodiment, each leg 46,48 comprises a central inner member 58 and a pair of outer end members 60,62. As illustrated, the outer end members 60,62 are preferably tubular in shape and configured to accept a portion of the central inner member 58. As with the arm members 54,56, in a preferred embodiment the central inner member 58 and outer members 60,62 are square in cross-sectional shape.

As described, the length of the bracket 44 may be changed by sliding the central inner members 58 in and out of either or both of the outer end member 60,62 of the legs 46,48. Likewise, the width of the bracket 44 may be changed by sliding the inner arm members 54 in and out of the outer arm members 56 of the arms 50,52.

In one embodiment, means maybe provided for selectively locking or retaining the bracket 44 in one or more particular positions. In one embodiment, this means may comprise mating pins and apertures. For example, a plurality of apertures 64 may be provided in each central inner member 58 of each leg 46,48 for selective engagement by a pin 66, ball or similar member associated with each outer end member 62. The apertures 64 may be spaced in linear sequence along the member for engagement by the pin 66 in a variety of position. Similar means maybe associated with the arm members.

In a preferred embodiment, as illustrated in FIG. 3, the bracket 44 may be associated with the mounting platforms 38. In use, the bracket 44 is preferably connected to the platforms 38 and spans the platforms. As indicated, the size of the bracket 44 may be changed depending upon the item to be supported.

In order to allow the bracket 44 to be resized, the bracket 44 is preferably configured to be quickly attached and detached from the platforms 38. The bracket 44 might be connected, for example, by hook and loop fastening material. The bracket 44 might also be connected with one or more fasteners, ties or the like, such as to the apertures 40 in the platforms 38. In one embodiment, one or more pins might be associated with the bracket 44 and configured to be connected to the apertures 40 in the platforms 38. This would allow the bracket 44 to be "snapped" into engagement with the platforms 38. The varying sizes of the bracket 44 may be accommodated by the various locations of the apertures 40 in the platforms 38.

Figure 4:
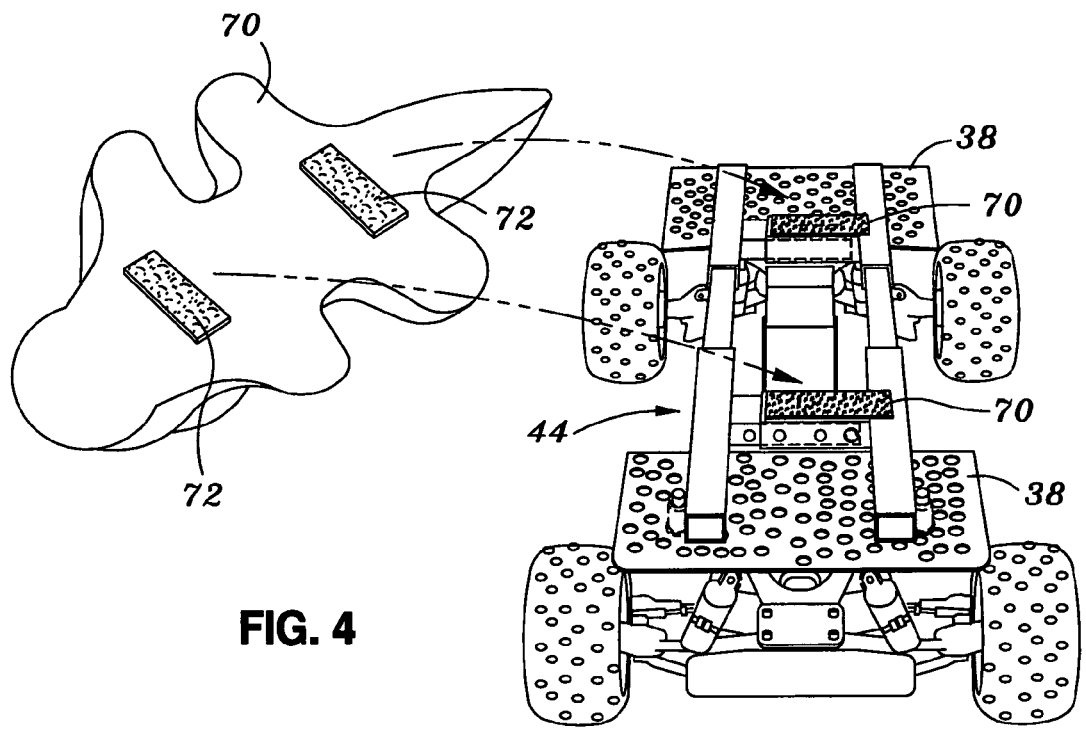
FIG. 4 illustrates a toy element configured for connection to the motorized entertainment device of the invention.
Figure 5:
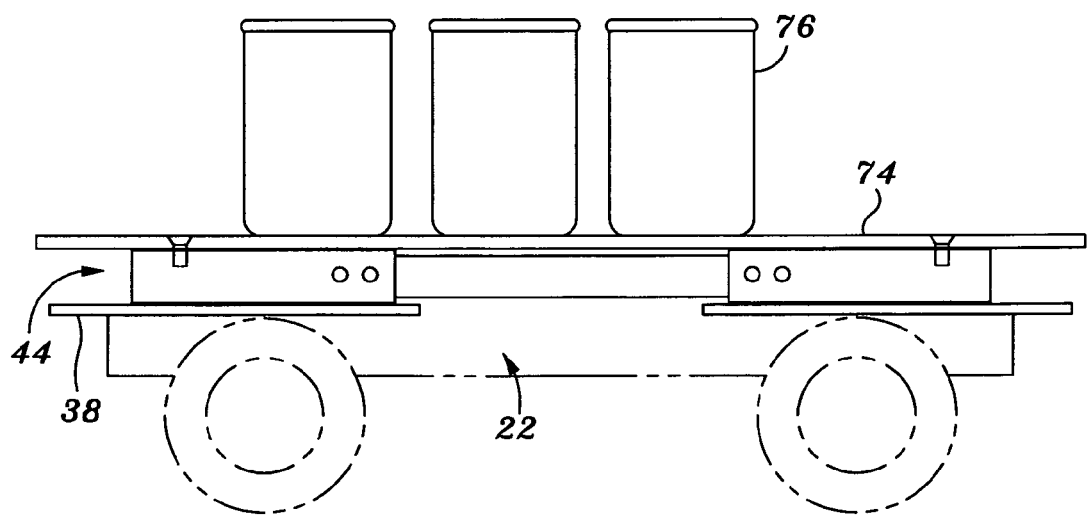
FIG. 5 illustrates a motorized entertainment device of the invention supporting items for transport.

FIGS. 4 and 5 illustrate uses of the entertainment device 20. As illustrated in FIG. 4, a toy 70 may be connected to the bracket 44 and thus be associated with the device 20. In this configuration, the device 20 may be used as a child or pet entertainment device. For example, when the toy 70 comprises an animal-likeness such as an animal-looking toy or similar member, when the device is moved, an animal such as a dog or cat may find amusement in chasing and attempting to catch the device 20. A child may similarly find the device 20 amusing when a likeness of a dinosaur, dog, cat, cow or other element is connected thereto.

In one embodiment, items may be connected to the bracket 44 using various means. In order to permit selective connection to and disconnection from the bracket 44, mating hook and loop fastening material 70,72 may be utilized. As illustrated, one mating portion of the material is preferably associated with the bracket 44 and the other with the element or member to be connected thereto. Of course, more than one pairing of hook and loop material may be utilized to secure the member to the bracket 44. When the device 20 is used as a pet entertainment toy, the animal likeness is preferably connected to the bracket 44 with a releasable fastening means. In this manner, when a pet "catches" the device and bites the animal likeness, the likeness will separate from the remainder of the device 20, thus preventing damage to the device (as my occur if a dog carried the device and dropped it).

The size of the bracket 44 is preferably adjusted based upon the size of the item to be connected to the device 20. For example, if the item to be connected is short and/or narrow, the bracket 44 is shortened and narrowed. Likewise, if the item to be connected is long and/or wide, the bracket 44 may be similarly be extended. For example, if the device 20 is configured for amusement by a child, a stuffed dinosaur may be connected to the bracket 44. If the device 20 is then configured for play with a pet, the dinosaur may be removed and the bracket 44 may be resized (such as made much smaller) and a small rodent-likeness may be connected thereto.

It is noted that items maybe directly connected to the platforms 38, such as with fasteners or hook and loop material. However, the bracket 44 can provide support for items having a wide range of shapes and sizes, including shapes and sizes which would not permit mounting of the item directly to the platforms 38. While the platforms 38 could be resized (such as to comprise a single large platform or two large platforms), it is desirable to keep the platforms 38 small in order to minimize the base dimension of the device 20 (so, for example, its dimensions are not always large even when an item to be associated therewith is not).

FIG. 5 illustrates an embodiment of the invention where a support 74 is mounted to the bracket 44. As illustrated, the support 74 is a generally planar plate. The support 74 may be connected to the bracket 44 by fasteners. The support 74 defines a top surface for supporting various items, such as beverages 76. In this manner, the device 20 maybe utilized to transport various items from one location to another. Of course, the support 74 might have other configurations, such as a bowl for containing liquid or the like.

In use, as described above, the device 20 is preferably remote controllable. In this manner, a user may transmit instructions to the device 20 to cause the device to move, such as in forward or reverse, to turn, or to stop.

Figure 6:
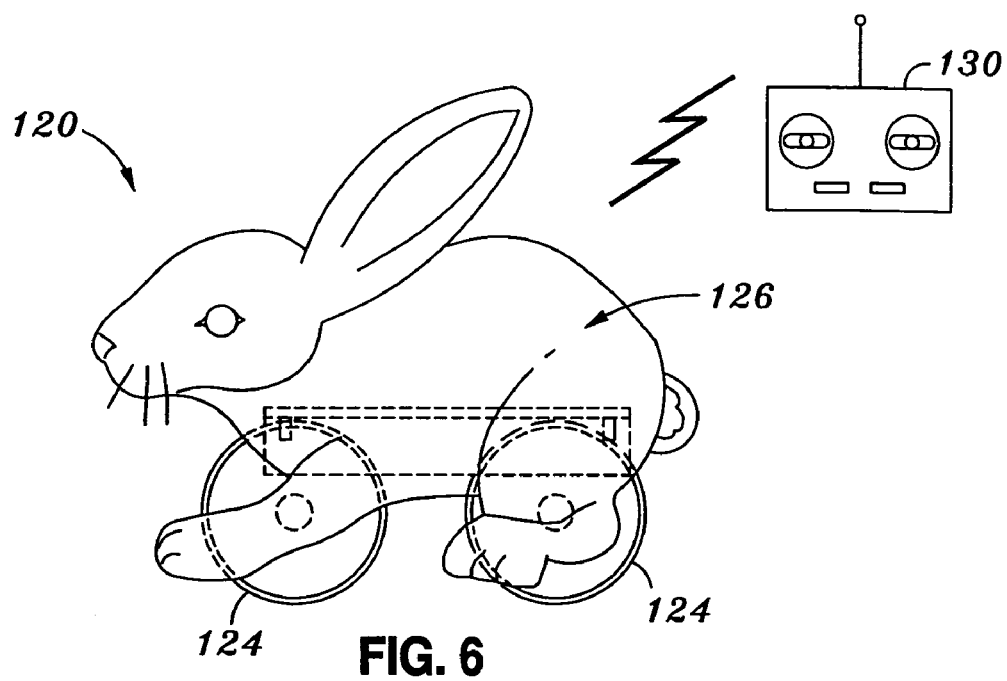
FIG. 6 illustrates another embodiment motorized entertainment device in accordance with the present invention.
Figure 7:
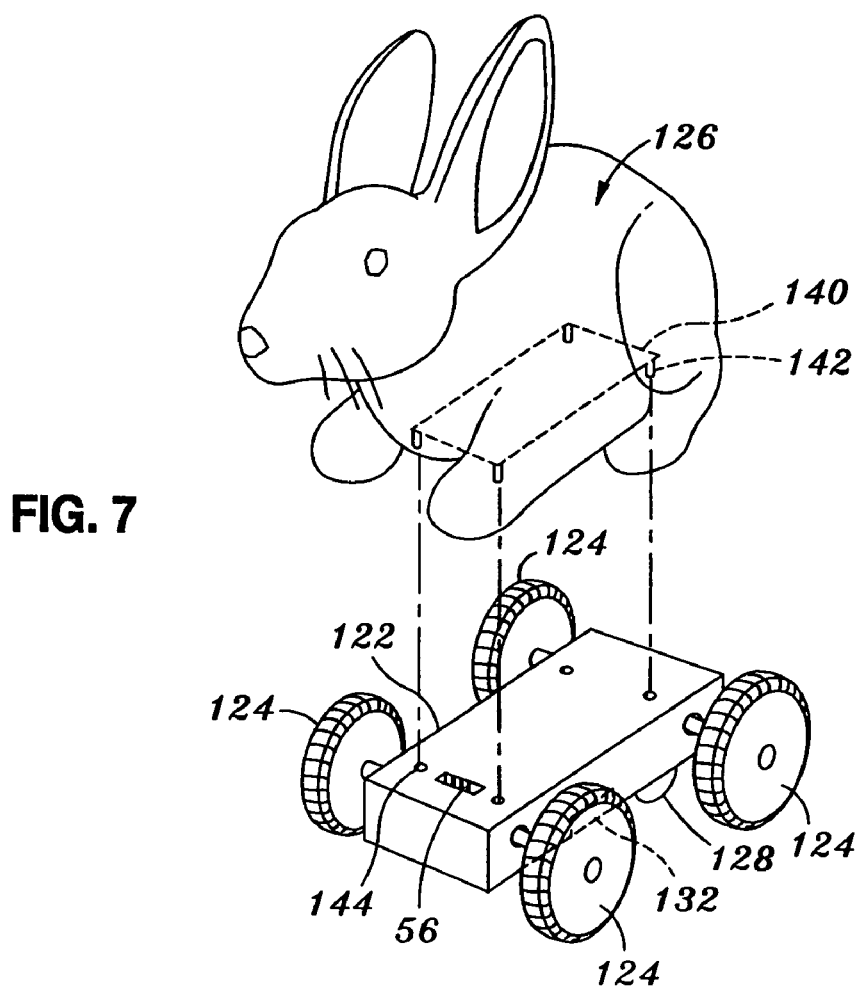
FIG. 7 is an exploded view of the device illustrated in FIG. 6.
Figure 8:
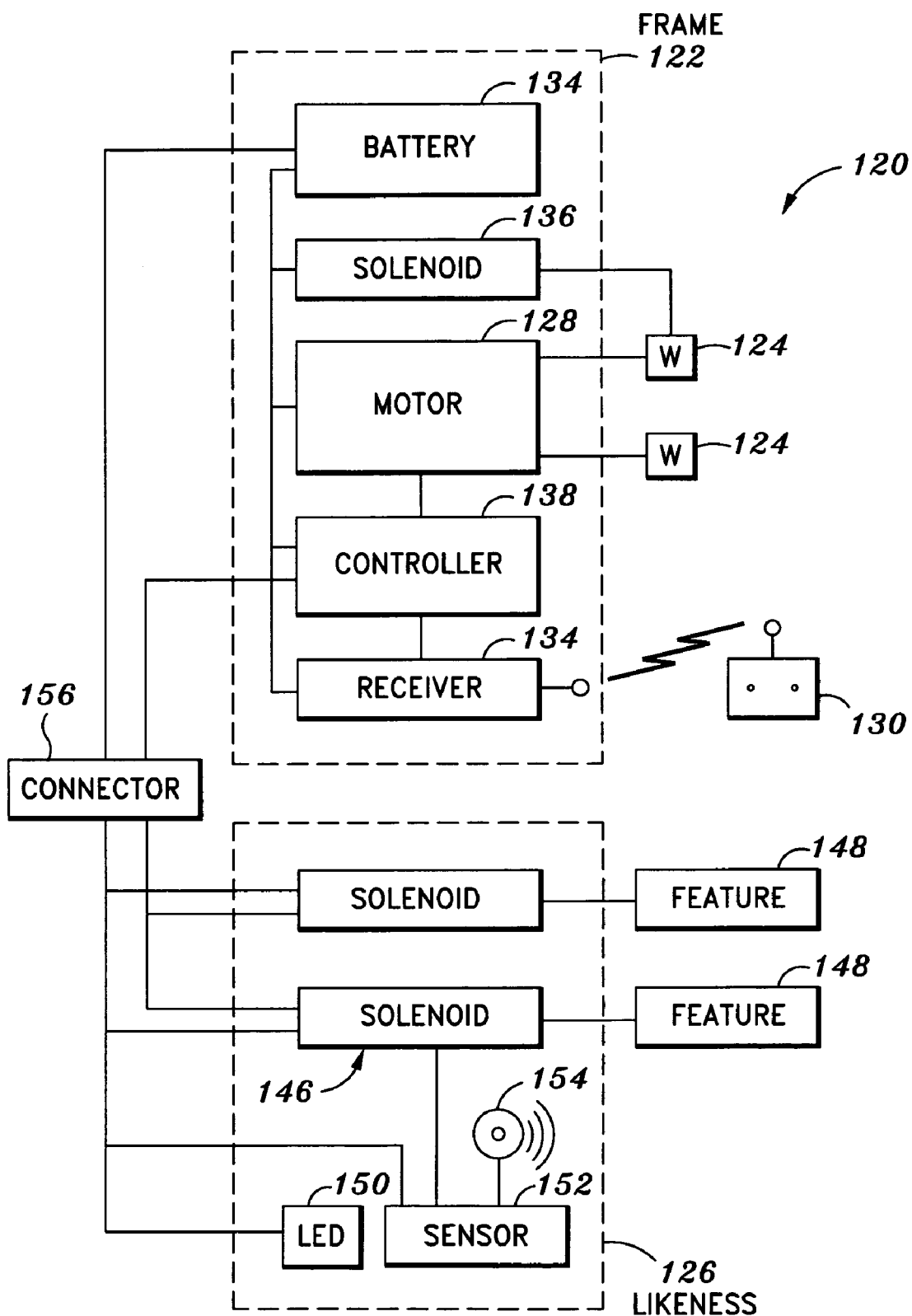
FIG. 8 is a block diagram of various components of the device illustrated in FIG. 6.

The device 20 may have a variety of other configurations. In an alternate embodiment of the invention, the entertainment device maybe particularly configured as a pet entertainment device rather than a generic carrier. FIG. 6 illustrates one embodiment of a such a toy 120 in accordance with one embodiment of the invention. Referring to FIG. 7, the toy 120 once again includes a frame 122 which supports various components of the toy 120, the toy 120 being rollably supported, such as a by a plurality of wheels 124 mounted to the frame 122 for rotation with respect to the frame. In a preferred embodiment, the toy 120 again has four wheels 124 generally arranged in automobile format, with two front wheels and two rear wheels, with two wheels located at each side of the frame 122.

The toy 120 is again is self-propelled or locomotive, as described above relative to the device 120. Again, an electrical source is configured to power the motor(s) in such a configuration. In one embodiment, the electrical source comprises one or more batteries 132, whereby the power source for the motor(s) is portable and may travel with the toy 120. In one embodiment, the battery or batteries 32 may be disconnected from the frame 122. Further, the one or motors are remotely controllable. Referring to FIG. 3, the toy preferably includes one or more receivers 134. The at least one receiver 134 is configured to receive signals from a remote control 130. Preferably, the receiver 134 is configured to provide an output in response to a signal received from the remote control 130. In one embodiment, the output is provided to a main controller 138 which utilizes the signals to provide discrete outputs to the various components of the toy, such as the motors, for controlling them. The toy 120 is also preferably steerable, such as by use of one or more solenoids 136.

In a preferred embodiment, at least a portion of the toy 120 has the appearance of an animal. In one embodiment, an animal likeness or representation 126 is associated with the frame 122. The animal likeness 126 preferably may only have the general appearance of an animal or other object. The animal likeness 126 may be, for example, a rabbit. The rabbit likeness need not exactly duplicate a real rabbit, and may vary in color and size, and need not include all anatomical features. Preferably, however, the animal likeness has some features or characteristics of a rabbit or other animal which is to be represented, such as general shape, simulation of fur or the like.

The animal likeness 126 may be constructed of a variety of materials. In a preferred embodiment, the animal likeness 126 is constructed of a durable and at least partially pliable material. For example, the animal likeness 126 may be constructed at least partially of a fabric material. An interior portion of the likeness may be filled with a compressible material, such as foam or other stuffing material.

The animal likeness 126 is preferably connected to the frame 122, either directly or indirectly. In one embodiment, the animal likeness 126 may include a mount or frame 140 which is connected to the frame 122 of the toy 120, such as with one or more fasteners. For example, the animal likeness 126 may include a generally rigid base and that base maybe connected to the frame 122 with threaded fasteners.

In another embodiment, the animal likeness 126 may be disengageable from the frame 122. For example, if a dog were to grasp the animal likeness 126 and attempt to move or lift the toy 120, the likeness 126 may be configured to disconnect from the frame 122 to prevent the electronics, drive and other elements of the toy 120 from being damaged. For example, the likeness 126 might connect to the frame with flexible pins or tabs 142. Upon being picked up, those tabs may be configured to flex and disengage corresponding mounting holes 144 in the frame.

In one embodiment, the animal likeness 126 may be animated. Motors or other means may be provided for moving one or more portions of the likeness 126. For example, referring to FIG. 3, solenoids 146 may be configured to move the legs, ears, head or other features 148 of the animal likeness 126. In one embodiment, animation of the likeness 126 may be initiated by signal from the remote control 130. In another embodiment, the animation may be initiated by other input, such as motion of the toy 120.

In one embodiment, the animal's eyes may include LED's 150 or other lights sources for illuminating them. The likeness 126 may include one or more pressure sensors 152. Those sensors 152 may trigger animation of the likeness 126. In one embodiment, the toy 120 may include a sound generating device 154, such as a speaker. In response to input via a pressure sensor 152, the sound generating device may be activated. For example, in response to a dog grasping the toy with its jaws, the sound generating device may be configured to output a squeaking noise.

In one embodiment, the likeness 126 may include a "vibration" element which is triggered by a pressure sensor or via remote control. The vibration device is preferably configured to generate a pulsating or shaking movement to the likeness.

The toy 120 may include one or more sensors for detecting obstacles and causing the main controller to automatically change the direction of the toy 120 in order to avoid obstacles. The toy 120 may also be configured to travel set paths or patterns. For example, instead of remotely controlling the movement of the toy 120 in real time, the toy 120 could be programmed or instructed to follow a path or pattern, thus freeing the operator from having to direct the toy.

In one embodiment, various of the animation features of the likeness 126 may be configured to activate in coordination with other elements of the toy. For example, when the one or more motors 128 are activated to move the toy, animation features of the likeness 126 may be activated to effect movement of legs of the likeness 126 to simulate hopping or running.

Various of the components of the likeness 126 may require power for their operation. In one embodiment, the likeness 126 could include one or more batteries or other power sources for that purpose. In a preferred embodiment, an electrical plug or contact 156 is associated with the frame 122, as illustrated in FIG. 2. The likeness 126 may include a mating connector (not shown) which engages that plug or contact 156 when the likeness 126 is connected thereto. Preferably, the connection of the connector and plug permits easy disconnection, as when a pet grasps the likeness 126 and disconnection of the likeness 126 from the frame 122 is desired. Referring to FIG. 3, when the likeness 126 is connected to the frame 122 in this manner, an electrical path is established from the batter 134 to the various components of the likeness 126, thus providing power to them.

In one embodiment, the plug and mating connector may include a communication path from the controller 138 to one or more components of the likeness 126, as illustrated in FIG. 3. In this manner, the controller 138 may effect operation of one or more of those components. In a less preferred embodiment, the likeness 126 could include a separate controller and receiver and instructions could directly be received at the likeness and the components of the likeness be independently controlled.

In one embodiment, the animal likeness 126 may house or enclose various components of the toy 120. Such an embodiment of the invention is illustrated in FIG. 1 where the wheels 124 are located substantially within the animal likeness 126, the wheels configured to extend below the likeness 126 for contact with the ground. In this manner, the wheels 124 are not exposed, either distracting from the toy's simulation of an actual animal, or posing a risk of harming a pet who might contact the wheel.

Of course, the size of the toy 120 may vary, including depending upon the animal which is being simulated. In one embodiment, the wheels 124 may be about 2-6 inches in diameter, be spaced front to back by about 4-8 inches and from side to side by about 4-8 inches. In such an embodiment, the toy 120 is capable of traveling over a wide variety of surface, including outdoor surfaces. In such embodiments, the toy 120 may include such features as multiple wheel drive and wheel suspension to allow the toy to quickly move over rough surfaces. Other configurations may be permitted for indoor use.

The likeness 126 may be about 3-18 inches long, 3-10 inches wide, and about 3-20 inches tall. Of course, the frame is preferably sized to accommodate the likeness 126. The size of the likeness 126 may depend on a variety of factors. For play with a large dog, the likeness 126 may be larger. For play with a small dog or cat, the likeness may be smaller. As indicated, the total size of the toy 120 may vary depending upon the size of the likeness 126. For example, if the likeness 126 is small, the frame and wheels may be correspondingly small.

In a preferred embodiment, the likeness 126 is of an animal. As indicated, the extent of the likeness may vary and include, for example, extinct animals (dinosaurs) or fictitious animals (purple elephant). The toy 120 may include a likeness of other objects, however, such as people or objects.

It will be appreciated that various of the features of the toy 120 just described may apply to a variety of other configurations of the entertainment device of the invention. Further, the entertainment devices of the invention may have a number of other configurations and features. For example, the device of the invention may include rotating tracks, skids, or other means for movably supporting it for movement. The devices may have more than four wheels or less than four wheels. The devices may be powered by other means than an electric motor, such as a gas or other burning fuel motor.

The device maybe configured for other movement. For example, the entertainment device may be configured to roll or spin. The device may be configured to spin by turning all of the wheels. In another embodiment, the device may include a center or central wheel which is used to effectuate spinning and/or turning of the toy. For example, the outer wheels of the device may be mounted as caster and simply provide rolling support, while a single central wheel provides propulsion to the device.

In one embodiment, the toy 120 may be configured so that different likenesses may be attached thereto. For example, an owner might wish to attach the likeness of a cat when playing with their dog, and the likeness of a mouse when playing with their cat. In the event the likeness is damaged, the owner could also easily replace it without having to replace all of the propulsion mechanisms. As indicated above, the toy 120 might be configured to include a mounting bracket or the like, such as described relative to the device 20, thus permitting such interchangeability of elements.

The main controller 138 and receiver 134 of the toy or other device in accordance with the invention may be combined into a single element, and the components may be arranged in a variety of fashions. The signals or other outputs of the various components may be analog or digital, and signals may be transmitted over wires or fibers or wirelessly.

The entertainment device of the invention has numerous advantages and features. The device is configured to be self-propelled. Thus, the device is configured to move, and can thus be chased by pets. Because of the configuration of the device, the device may be used in a yard or over a wide variety of surfaces and move at sufficiently high speeds and over sufficient distances to challenge the pet in a real chase. At the same time, because the device is self-propelled, it takes little or no effort on the part of the pet owner to operate it.

When the device is configured to include an animal likeness, the device appeals to the instincts of the pet, causing the pet to desire to chase the device.

The pet owner may control the device using the remote control apparatus causing the device to move in various directions, such as forward, backward and to start and stop. Other controls may permit the operator to animation of the likeness in order to increase the pet's interest in the toy because of the realistic nature of the likeness through its movement.

Once the pet catches the toy, the pet owner can establish some verbal commands to cause their pet to release the toy from its jaws. The pet owner can then retrieve the device and start the game again. The pet may also be permitted to catch the toy and then bite or chew it, even to the point of destroying the likeness. The animal likeness may then be replaced, as described above. In this configuration, the animal is rewarded in its efforts to catch the device, and the owner can cheaply and quickly replace the likeness with one of a variety of likenesses for future use.

While the entertainment device of the invention has particular applicability as a pet toy, the device has a wide range of other uses, including for transporting items. The device can be used as a child's toy as well.

It will be understood that the above described arrangements of apparatus and the method there from are merely illustrative of applications of the principles of this invention and many other embodiments and modifications may be made without departing from the spirit and scope of the invention as defined in the claims.

What is claimed is:

1. A motorized amusement device comprising:
   a frame;
   one or more wheels rollably supporting the frame;
   at least one motor in driving relationship with one or more of the wheels;
   a power source configured to provide power to the at least one motor;
   a receiver configured to receive signals from a remote controller;
   a main controller configured to receive signals received by said receiver and to provide an output to said at least one motor to operate said motor;
   at least one platform supported by said frame; and
   an adjustable bracket configured to connect one or more elements to said device, said bracket connected to said at least one platform, said adjustable bracket has a pair of spaced legs connected by a pair of arms, wherein a length of said legs and a length of said arms may be adjusted.

2. The motorized amusement device in accordance with claim 1 including a pair of spaced platforms and wherein said adjustable bracket extends between said platforms.

3. The motorized amusement device in accordance with claim 2 wherein a first platform is located between a front pair of wheels and a second platform is located between a rear pair of wheels.

4. The motorized amusement device in accordance with claim 1 including a support connected to said bracket.

5. The motorized amusement device in accordance with claim 1 wherein said device is configured as an entertainment device, said device including an animal likeness connected to said bracket.

6. The motorized amusement device in accordance with claim 5 wherein said animal likeness includes a fabric material covering a stuffing.

7. The motorized amusement device in accordance with claim 1 wherein at least one of the wheels is steerable.

8. The motorized amusement device in accordance with claim 1 wherein said at least one motor is configured to drive at least one wheel in a forward and a reverse direction.

9. The motorized amusement device in accordance with claim 1 including means for detachably connecting said one or more elements to said bracket.

* * * * *